(12) United States Patent
Yamafuji

(10) Patent No.: US 7,948,112 B2
(45) Date of Patent: May 24, 2011

(54) ELECTRIC EQUIPMENT MOUNTING STRUCTURE AND ELECTRIC VEHICLE

(75) Inventor: Takahiro Yamafuji, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 307 days.

(21) Appl. No.: 12/280,213

(22) PCT Filed: Feb. 20, 2007

(86) PCT No.: PCT/JP2007/053464
§ 371 (c)(1),
(2), (4) Date: Aug. 21, 2008

(87) PCT Pub. No.: WO2007/105465
PCT Pub. Date: Sep. 20, 2007

(65) Prior Publication Data
US 2010/0213760 A1  Aug. 26, 2010

(30) Foreign Application Priority Data
Feb. 23, 2006  (JP) .................................. 2006-046935

(51) Int. Cl.
*B60L 1/00* (2006.01)
(52) U.S. Cl. ........................................................ 307/9.1
(58) Field of Classification Search .................... 307/9.1
See application file for complete search history.

(56) References Cited

U.S. PATENT DOCUMENTS

| | | | |
|---|---|---|---|
| 5,441,421 A | 8/1995 | Ponticelli, Jr. et al. | |
| 6,460,642 B1 | 10/2002 | Hirano | |
| 7,631,712 B2 * | 12/2009 | Watanabe | 180/68.5 |
| 2003/0226653 A1 | 12/2003 | Takedomi | |
| 2004/0200647 A1 | 10/2004 | Shingo et al. | |
| 2005/0205316 A1 | 9/2005 | Yamafuji | |
| 2006/0030176 A1 | 2/2006 | Ikeda et al. | |

FOREIGN PATENT DOCUMENTS

| | | |
|---|---|---|
| JP | 08-035458 A | 2/1996 |
| JP | 2000-152470 A | 5/2000 |
| JP | 2001-97052 A | 4/2001 |
| JP | 2001-132566 A | 5/2001 |
| JP | 2003-49683 A | 2/2003 |
| JP | 2003-320854 A | 11/2003 |
| JP | 2004-9939 A | 1/2004 |
| JP | 2004-161056 A | 6/2004 |
| JP | 2004-181979 A | 7/2004 |
| JP | 2004-304902 A | 10/2004 |
| JP | 2005-207241 A | 8/2005 |
| JP | 2005-262894 A | 9/2005 |
| JP | 2006-44443 A | 2/2006 |

* cited by examiner

*Primary Examiner* — Robert L. DeBeradinis
(74) *Attorney, Agent, or Firm* — Sughrue Mion, PLLC

(57) ABSTRACT

An electric equipment mounting structure includes: a PCU mounted inside an engine room of a hybrid vehicle; an air cleaner mounted inside the engine room of the hybrid vehicle with a distance between the PCU; and cables connected to a surface, facing the air cleaner, of the PCU.

11 Claims, 5 Drawing Sheets

ELECTRIC EQUIPMENT MOUNTING STRUCTURE AND ELECTRIC VEHICLE

TECHNICAL FIELD

The present invention relates to an electric equipment mounting structure and to an electric vehicle. In particular, the present invention relates to an electric equipment mounting structure mounted inside a closed space in a vehicle, and to an electric vehicle with such a structure.

BACKGROUND ART

Conventionally, electric vehicles having electric equipment including an inverter and the like mounted inside an engine room are known.

For example, Japanese Patent Laying-Open No. 2005-207241 (Patent Document 1) discloses an engine intake device of a hybrid vehicle provided with an inverter inside a housing of an air cleaner.

Japanese Patent Laying-Open No. 2004-181979 (Patent Document 2) discloses a power control unit, wherein a reinforcing member is provided on an outer wall of a high-voltage box, and a high-voltage terminal block is provided on an inner wall of the high-voltage box protected by the reinforcing member.

Japanese Patent Laying-Open No. 2004-161056 (Patent Document 3) discloses a vehicle body structure provided with a displacement allowance space for allowing for displacement of a unit box upon collision.

Japanese Patent Laying-Open No. 2005-262894 (Patent Document 4) discloses a structure including a bracket that deforms following deformation of a vehicle frame member and an inverter fixed to the vehicle frame member with the bracket. Here, an inverter also displaces following displacement of the bracket, so as to prevent a high-voltage line connected to the inverter from being caught between the vehicle frame member and the inverter.

In an electric vehicle, electric equipment of relatively high voltage tends to be used, in order to obtain sufficient drive force, for example. Accordingly, a high-voltage cable is connected to such electric equipment. In such a case, when structures surrounding the electric equipment deforms or the electric equipment moves due to an external factor such as collision, the high-voltage cable may be caught between the electric equipment and other components.

In Patent Document 1, the inverter is provided inside the housing of the air cleaner. This complicates the structure of the air cleaner and increases costs. Patent Documents 2-4 also fail to disclose any configuration that can sufficiently protect the high-voltage cable while suppressing an increase in costs.

DISCLOSURE OF THE INVENTION

An object of the present invention is to provide an electric equipment mounting structure being capable of protecting a line while suppressing an increase in costs, and to provide an electric vehicle with such a structure.

An electric equipment mounting structure according to the present invention includes: electric equipment mounted inside a closed space of a vehicle; a resin component mounted inside the closed space of the vehicle with a distance from the electric equipment; and a line connected to a surface, facing the resin component, of the electric equipment.

With such a configuration, when a structure surrounding the electric equipment deforms or the electric equipment moves due to an external factor and whereby the line is caught between the electric equipment and the resin component, the resin component can deform to absorb the shock. Accordingly, without the necessity of providing a new member and while suppressing an increase in costs, the line can be protected.

It is to be noted that, in the foregoing, a "resin component" refers to a component that includes a resin portion that deforms easier than the electric equipment when receiving a load.

Preferably, in the electric equipment mounting structure, a plurality of the lines are connected to the surface, facing the resin component, of the electric equipment.

Thus, a plurality of lines can be protected.

Preferably, in the electric equipment mounting structure, the line is connected to a surface, positioned on a rear side of the vehicle, of the electric equipment.

Thus, the line can be protected from a load from the front side of the vehicle.

Preferably, in the electric equipment mounting structure, the electric equipment and the resin component are provided so as to align in a lateral direction.

Thus, the line can be protected from a load from the lateral direction.

As one example, the electric equipment mounting structure further includes an other line connected to a surface of the electric equipment, the surface being different from the surface facing the resin component. Here, the line connected to the surface, facing the resin component, of the electric equipment is higher in voltage than the other line.

Thus, the line of high voltage can be protected on a priority basis.

Preferably, in the electric equipment mounting structure, the electric equipment is for a voltage not lower than 42V. Further preferably, lines for a voltage not lower than 42V connected to the electric equipment are all connected to the surface, facing the resin component, of the electric equipment.

It is important to prevent damage to the lines connected to the electric equipment for high voltage. With the above-described configuration, such high-voltage lines can be protected.

In the electric equipment mounting structure, as an example, the electric equipment includes an inverter.

There may be a case where a line of relatively high voltage is connected to an inverter mounted on an electric vehicle. With the above-described configuration, such a line connected to the inverter can be protected.

Preferably, in the electric equipment mounting structure, the closed space is an engine room where an internal combustion engine is provided, and the resin component includes a case of an air cleaner provided in an air intake route of the internal combustion engine.

Here, as one example, the air cleaner includes the case being a component made of resin and a filter stored in the case, and deforms easier than the electric equipment when receiving a load.

As another example, the air cleaner is provided on a rear side of the vehicle relative to the electric equipment, and the line is connected to a side surface, positioned on the rear side of the vehicle, of the electric equipment.

The space inside the engine room of a vehicle is limited, and often lines are positioned between electric equipment and other components. In contrast, by providing line drawing portions of the electric equipment at the portion facing the resin component, the lines can be protected.

As an example, the electric equipment mounting structure further includes a motor-generator driving the vehicle. The electric equipment controls an operation of the motor-generator.

An electric vehicle according to the present invention includes the above-described electric equipment mounting structure. Thus, an electric vehicle incorporating an electric equipment mounting structure being capable of protecting a line while suppressing an increase in costs can be obtained. In the present specification, an "electric vehicle" includes all of a hybrid vehicle, a fuel-cell vehicle, and an electric vehicle.

According to the present invention, as described above, an electric equipment mounting structure being capable of protecting a line while suppressing an increase in costs can be obtained.

BEST MODES FOR CARRYING OUT THE INVENTION

Figure 1:
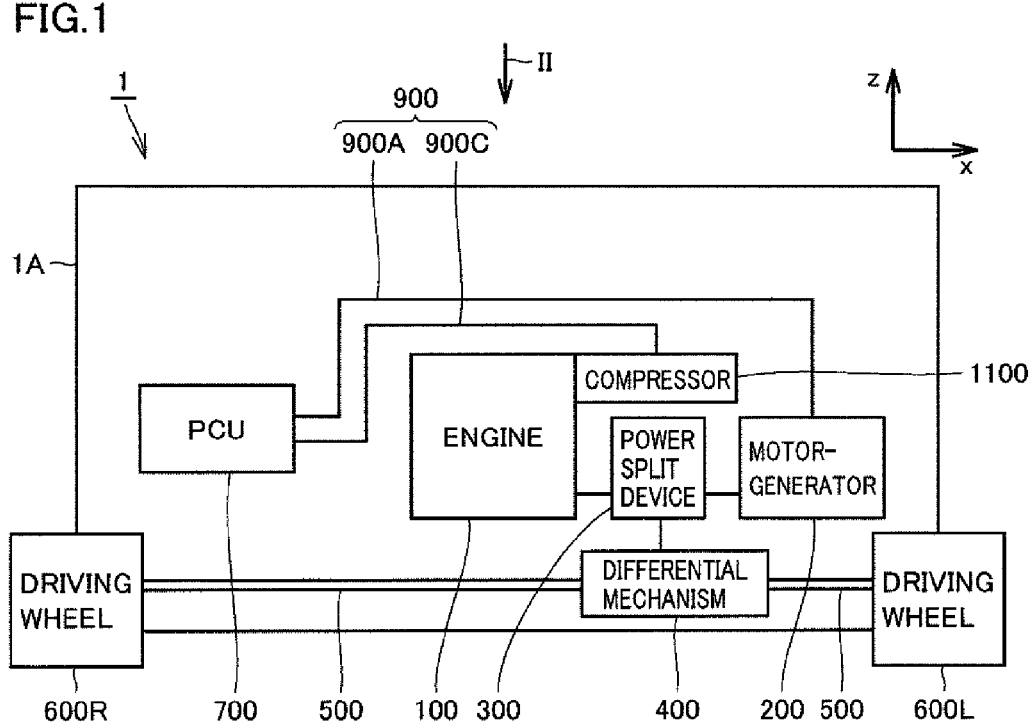
FIG. 1 is a schematic view showing a configuration of a hybrid vehicle to which an electric equipment mounting structure according to one embodiment of the present invention is applied.

In the following, an embodiment of an electric equipment mounting structure and an electric vehicle according to the present invention will be described. The same or corresponding parts are denoted by the same reference character and description thereof may not be repeated.

In the embodiment described in the following, reference to the number or quantity does not necessarily limit the scope of the present invention to the exact number or quantity, unless otherwise specified. Also, in the following embodiment, constituents are not necessarily essential for the present invention, unless otherwise specified.

Figure 2:
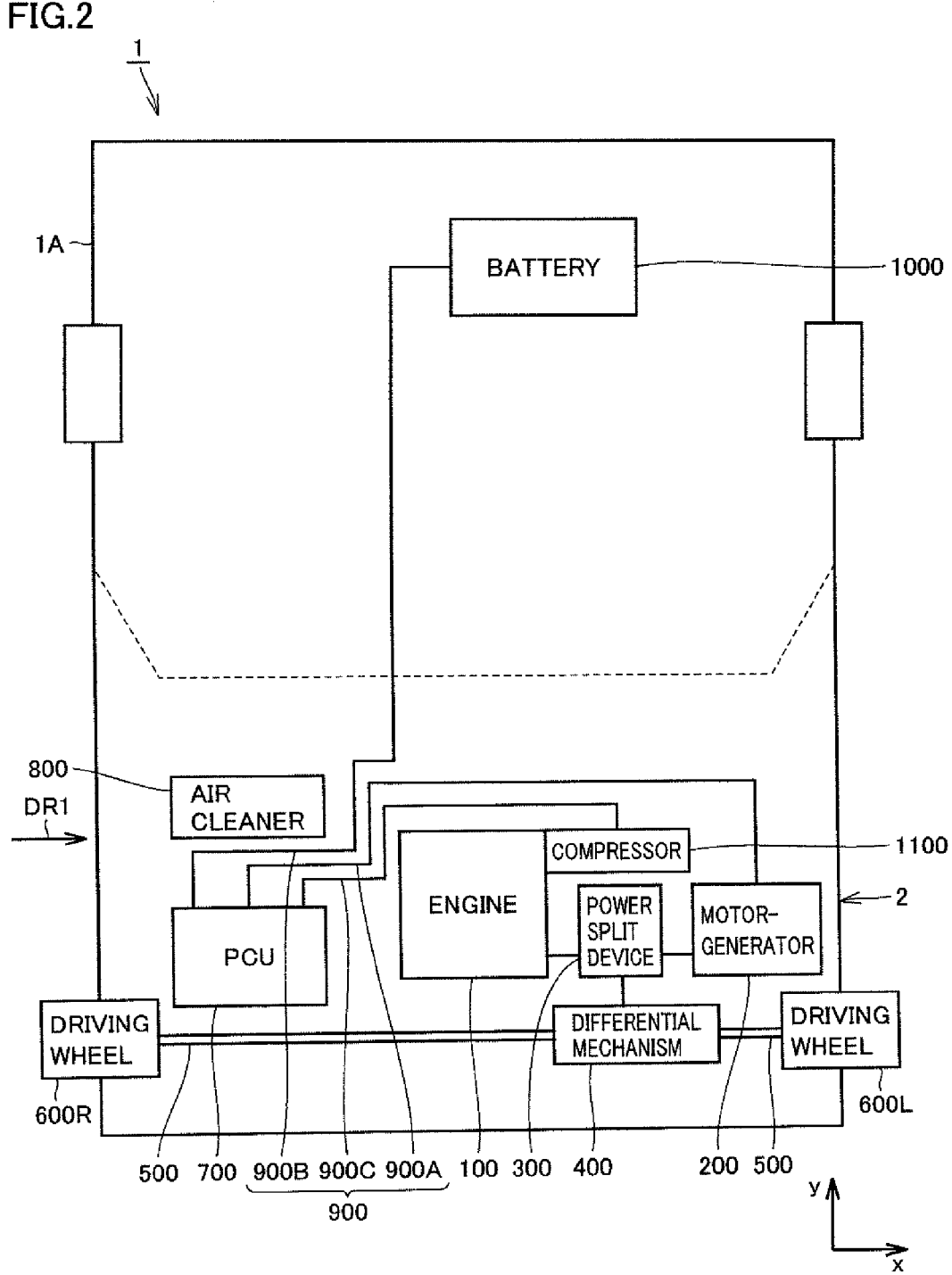
FIG. 2 is a schematic view showing the configuration of the hybrid vehicle as seen from the direction of arrow II in FIG. 1.

FIGS. 1 and 2 are schematic views showing a configuration of a hybrid vehicle having an electric equipment mounting structure according to one embodiment of the present invention. FIG. 2 shows a state as seen from the direction of arrow II in FIG. 1.

Referring to FIGS. 1 and 2, a hybrid vehicle 1 includes an engine 100, a motor-generator 200, a power split device 300, a differential mechanism 400, a driveshaft 500, driving wheels 600L, 600R being the front wheels, a PCU (Power Control Unit) 700, an air cleaner 800, a battery 1000, and A/C (air conditioner) compressor 1100.

As shown in FIG. 2, engine 100, motor-generator 200, power split device 300, PCU 700, and an A/C compressor 1100 are arranged inside engine room 2. Motor-generator 200 and PCU 700 are connected by a cable 900A. PCU 700 and battery 1000 are connected by a cable 900B. PCU 700 and A/C compressor 1100 are connected by a cable 900C. A power output apparatus formed by engine 100 and motor-generator 200 is coupled to differential mechanism 400 through power split device 300. Differential mechanism 400 is coupled to driving wheels 600L, 600R via driveshaft 500.

Motor-generator 200 is a three-phase AC (alternating current) synchronous motor-generator that generates drive force by AC power received from PCU 700. Motor-generator 200 is also used as a generator upon deceleration or the like of hybrid vehicle 1. By the generation function (regeneration), motor-generator 200 generates AC power which is output to PCU 700.

PCU 700 converts a DC (direct current) voltage received from battery 1000 into an AC voltage and exerts control to drive motor-generator 200. PCU 700 also converts an AC voltage generated by motor-generator 200 into a DC voltage and charges battery 1000.

Power split device 300 is configured to include a planetary gear (not shown), for example.

The motive power output from engine 100 and/or motor-generator 200 is transmitted from power split device 300 through differential mechanism 400 to driveshaft 500. The drive power transmitted to driveshaft 500 is transmitted to driving wheels 600L, 600R as rotation power, thereby allowing the vehicle to travel. Thus, motor-generator 200 functions as a motor.

On the other hand, upon deceleration or the like of the vehicle, motor-generator 200 is driven by driving wheels 600L, 600R or engine 100. Here, motor-generator 200 functions as a generator. The power generated by motor-generator 200 is stored in battery 1000 through an inverter inside PCU 700.

Figure 3:
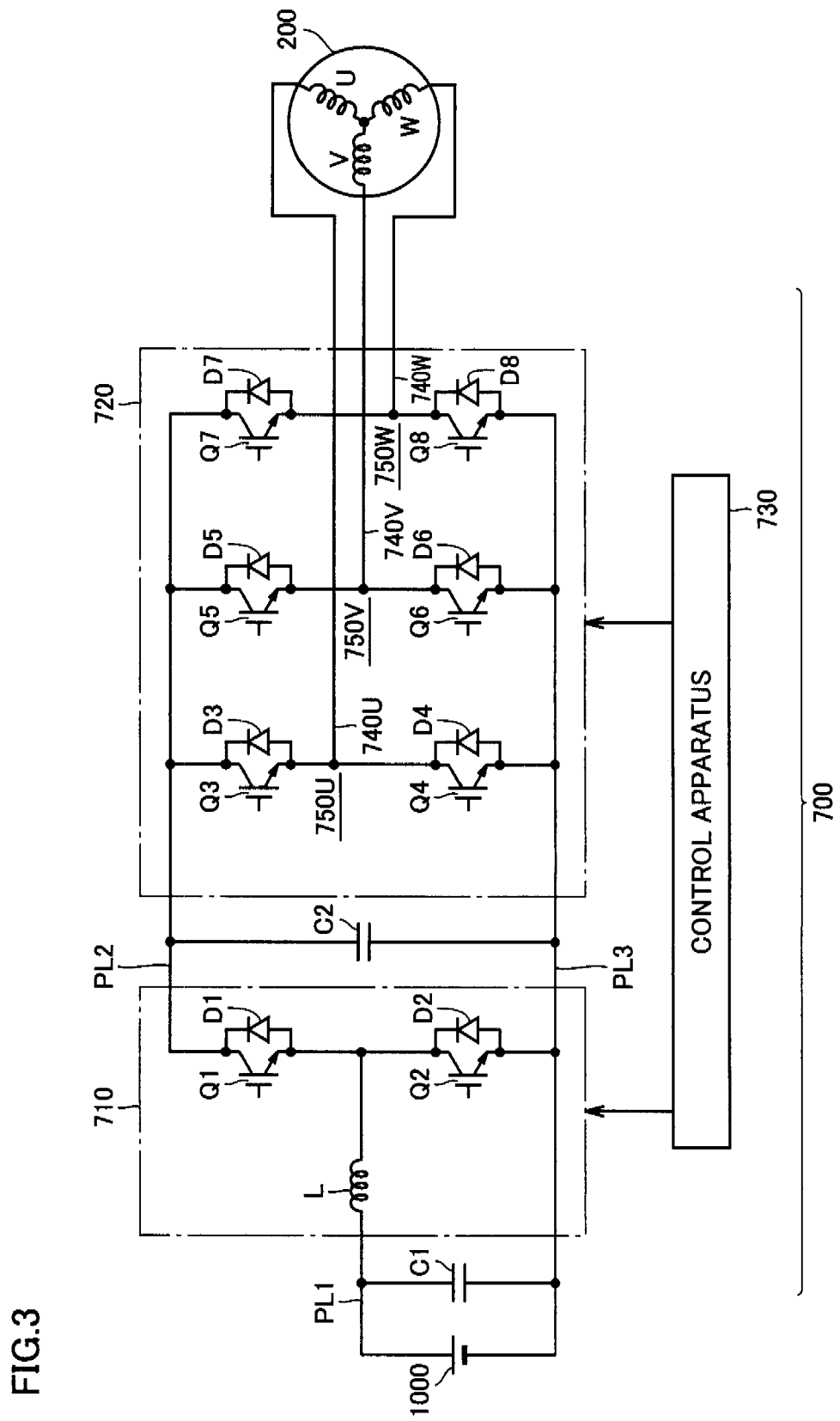
FIG. 3 is a circuit diagram showing a configuration of a substantial part of a PCU shown in FIGS. 1 and 2.

FIG. 3 is a circuit diagram showing a configuration of a substantial part of PCU 700. Referring to FIG. 3, PCU 700 includes a converter 710, an inverter 720, a control apparatus 730, capacitors C1, C2, power supply lines PL1-PL3, and output lines 740U, 740V, 740W. Converter 710 is connected between battery 1000 and inverter 720. Inverter 720 is connected to motor-generator 200 through output lines 740U, 740V, 740W.

Battery 1000 connected to converter 710 is a rechargeable battery such as a nickel-hydride or lithium ion battery. Battery 1000 supplies the generated DC voltage to converter 710, and is charged by the DC voltage received from converter 710.

Converter 710 is formed by power transistors Q1, Q2, diodes D1, D2, and a reactor L. Power transistors Q1, Q2 are connected in series between power supply lines PL2, PL3, and each receive at the base a control signal from control apparatus 730. Diodes D1, D2 are connected across collector and emitter of power transistors Q1, Q2, respectively, so as to pass currents from emitter side to collector side of power transistors Q1, Q2. Reactor L has one end connected to power supply line PL1 that is connected to the positive electrode of battery 1000, and has the other end connected to a connection point of power transistors Q1 and Q2.

Converter 710 uses reactor L to boost a DC voltage received from battery 1000, and supplies the boosted boost voltage to power supply line PL2. Also, converter 710 steps down a DC voltage received from inverter 720 and charges battery 1000.

Inverter 720 is formed by a U-phase arm 750U, a V-phase arm 750V and a W-phase arm 750W. These phase arms are connected in parallel between power supply lines PL2 and PL3. U-phase arm 750U includes power transistors Q3, Q4 connected in series. V-phase arm 750V includes power transistors Q5, Q6 connected in series. W-phase arm 750W includes power transistors Q7, Q8 connected in series. Diodes D3-D8 are connected across collector and emitter of power transistors Q3-Q8, respectively, so as to pass currents from emitter side to collector side of power transistors Q3-Q8. In each phase arm, the power transistors have their connection point connected through output line 740U, 740V, or 740W to a node of each phase coil of motor-generator 200 being opposite to the neutral point.

Based on a control signal from control apparatus 730, inverter 720 converts a DC voltage received from power supply line PL2 into an AC voltage and outputs the same to motor-generator 200. Inverter 720 rectifies an AC voltage generated by motor-generator 200 into a DC voltage and supplies the same to power supply line PL2.

Capacitor C1 is connected between power supply lines PL1 and PL3, and smoothes the voltage level of power supply line PL1. Capacitor C2 is connected between power supply lines PL2 and PL3 and smoothes the voltage level of power supply line PL2.

Control apparatus 730 calculates each phase coil voltage of motor-generator 200 based on a motor torque command value, each phase current value of motor-generator 200, and an input voltage of inverter 720. Based on the calculation result, control apparatus 730 generates a PWM (Pulse Width Modulation) signal turning on/off power transistors Q3-Q8 and outputs the same to inverter 720.

Control apparatus 730 calculates a duty ratio of power transistors Q1, Q2 for optimizing the input voltage of inverter 720, based on the above-mentioned motor torque command value and a motor rotation speed. Based on the calculation result, control apparatus 730 generates a PWM signal turning on/off power transistors Q1, Q2 and outputs the same to converter 710.

Furthermore, control apparatus 730 exerts control over the switching operation of power transistors Q1-Q8 in converter 710 and inverter 720, so as to convert AC power generated by motor-generator 200 into DC power and charge battery 1000.

In PCU 700, based on a control signal from control apparatus 730, converter 710 boosts a DC voltage received from battery 1000 and supplies the same to power supply line PL2. Inverter 720 receives from power supply line PL2 a DC voltage smoothed by capacitor C2. Inverter 720 converts the received DC voltage into an AC voltage and outputs the same to motor-generator 200.

Inverter 720 converts an AC voltage generated by regenerative operation of motor-generator 200 into a DC voltage, and outputs the same to power supply line PL2. Then, converter 710 receives from power supply line PL2 a DC voltage smoothed by capacitor C2. Converter 710 steps down the received DC voltage and charges battery 1000.

Cables 900 (900A, 900B, 900C) shown in FIGS. 1 and 2 are high-voltage lines used at relatively high voltage (for example, about not less than 200V and not more than 600V). Accordingly, it is important to protect cables 900 and to prevent leak from cables 900.

For example, the vehicle body may deform or PCU 700 may move, upon collision of the vehicle or the like, for example. In such a case, it is necessary to protect cables 900 positioned between PCU 700 and other parts of the vehicle (for example, vehicle body 1A, engine 100 and the like) so as to prevent damage to cables 900.

Figure 4:
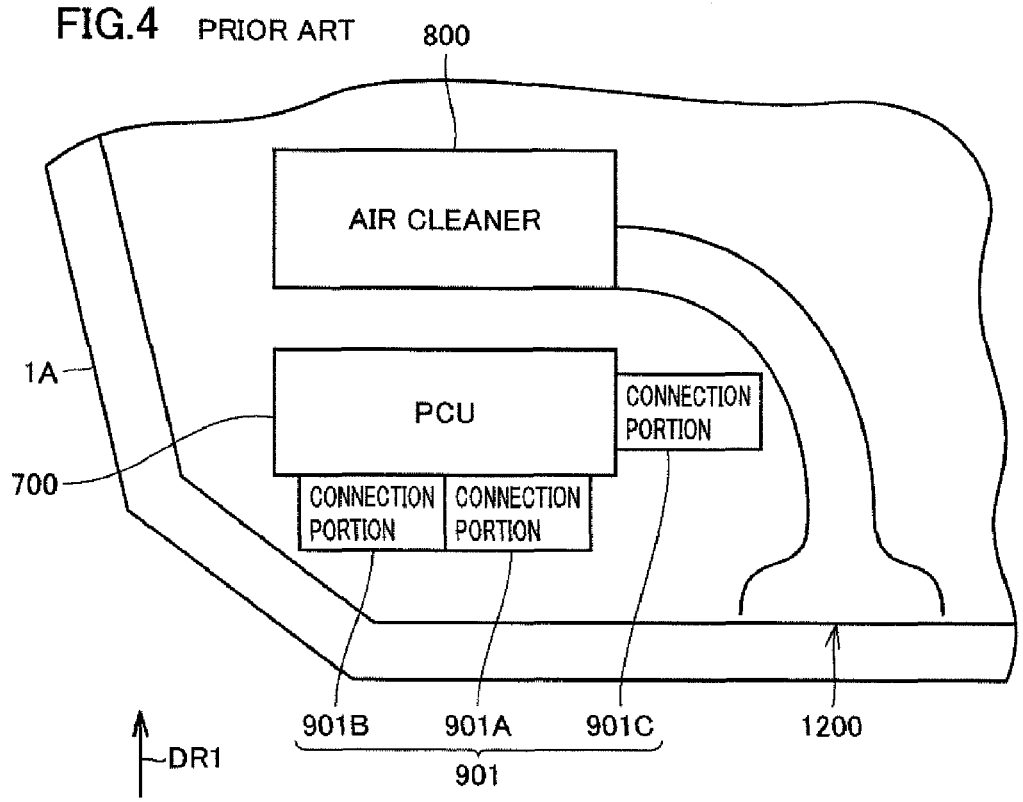
FIG. 4 shows an electric equipment mounting structure according to a comparative example.

FIG. 4 shows a mounting structure for PCU 700 according to a comparative example. Referring to FIG. 4, the mounting structure for PCU 700 according to the comparative example includes a PCU 700 and an air cleaner 800 provided on the rear side of the vehicle relative to PCU 700. Air cleaner 800 is a component provided in an air intake route to engine 100. Air cleaner 800 is supplied with air from an air intake port 1200.

As shown in FIG. 4, in the comparative example, a connection portion 901A (a connector), being an attaching portion to PCU 700, of cable 900A connecting PCU 700 and motor-generator 200, and a connection portion 901B, being an attaching portion to PCU 700, of cable 900B connecting PCU 700 and battery 1000, are provided on a side surface, on the front side of the vehicle, of PCU 700. A connection portion 901C, being an attaching portion to PCU 700, of cable 900C connecting PCU 700 and A/C compressor 1100, is provided on a side surface, on the right as one faces the direction from frontward to rearward of the vehicle, of PCU 700.

In the comparative example shown in FIG. 4, for example when a load (for example, a collision load) is applied in the arrow DR1 direction from the vehicle front side and vehicle body 1A deforms, cables 900 (in particular, cables 900A and 900B connected to connection portions 901A and 901B) connected to connection portions 901 (901A, 901B, 901C) will be caught between vehicle body 1A and PCU 700. If an attempt is made to fully protect cables 900 addressing this situation, the size of protection portions provided around cables 900 will be increased, or the structure of such protection portions will be complicated. Thus, costs will be increased.

Figure 5:
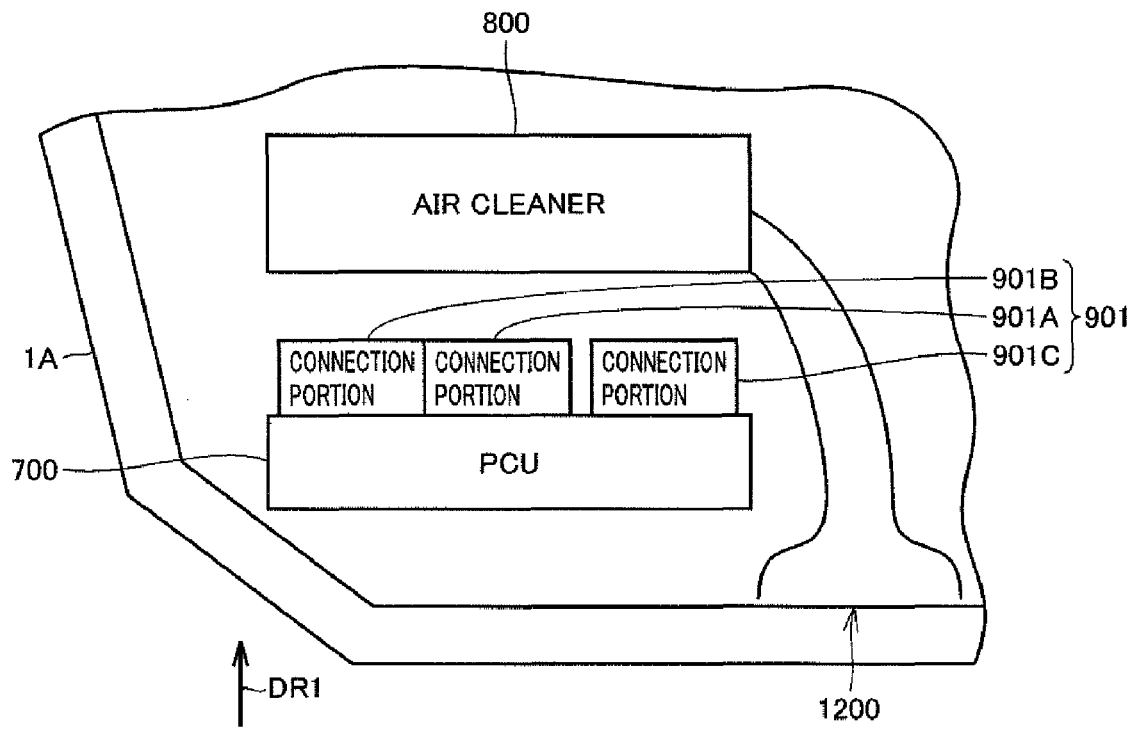
FIG. 5 shows an electric equipment mounting structure according to one embodiment of the present invention.

FIG. 5 shows a mounting structure for PCU 700 according to one embodiment. Referring to FIG. 5, the mounting structure for PCU 700 according to the embodiment includes, similarly to the above-described comparative example, PCU 700 and air cleaner 800 provided on the rear side of the vehicle relative to PCU 700.

As shown in FIG. 5, in the present embodiment, connection portion 901A, being an attaching portion to PCU 700, of cable 900A connecting PCU 700 and motor-generator 200, a connection portion 901B, being an attaching portion to PCU 700, of cable 900B connecting PCU 700 and battery 1000, and a connection portion 901C, being an attaching portion to PCU 700, of cable 900C connecting PCU 700 and A/C compressor 1100, are provided on a side surface, on the rear side of the vehicle, of PCU 700.

In the present embodiment, for example when a load (for example, a collision load) is applied in the arrow DR1 direction from the vehicle front side and PCU 700 moves in the arrow DR1 direction, cables 900 (900A, 900B, 900C) connected to connection portions 901 (901A, 901B, 901C) will be caught between PCU 700 and air cleaner 800. Here, because air cleaner 800 is a relatively soft component, damage to cables 900 can be prevented without providing a cable protection portion of a large size/complicated structure around cables 900, even when cables 900 are caught between PCU 700 and air cleaner 800. Thus, with the mounting structure for PCU 700 according to the present embodiment, cables 900 can be protected while suppressing an increase in costs.

It is to be noted that, while in the example shown in FIG. 5, three connection portions 901 (901A, 901B, 901C) are provided on the side surface of PCU 700 facing air cleaner 800, a single connection portion 901 or a plurality of connection portions 901 of arbitrary numbers (for example, two) may be provided on the side surface of PCU 700 facing air cleaner 800. Also, while in the example shown in FIG. 5, all the three connection portions 901A, 901B, 901C are provided on the side surface of PCU 700 facing air cleaner 800, part of three connection portions 901A, 901B, 901C may be provided on a side surface of PCU 700 other than the side surface facing air cleaner 800. In this case, preferably the voltage of cables (lines) connected to connection portions 901 provided on the side surface of PCU 700 facing air cleaner 800 is higher than the voltage of the cable (the other line) connected to connection portion 901 provided on the other side surface of PCU 700. Thus, the high-voltage cables can be protected on a priority basis. Furthermore, while in the example shown in FIG. 5, PCU 700 and air cleaner 800 are arranged so as to align in the lateral direction (substantially horizontal direction), there may be a case where PCU 700 and air cleaner 800 are aligned in a diagonal direction or in the height direction (substantially vertical direction).

Figure 6:
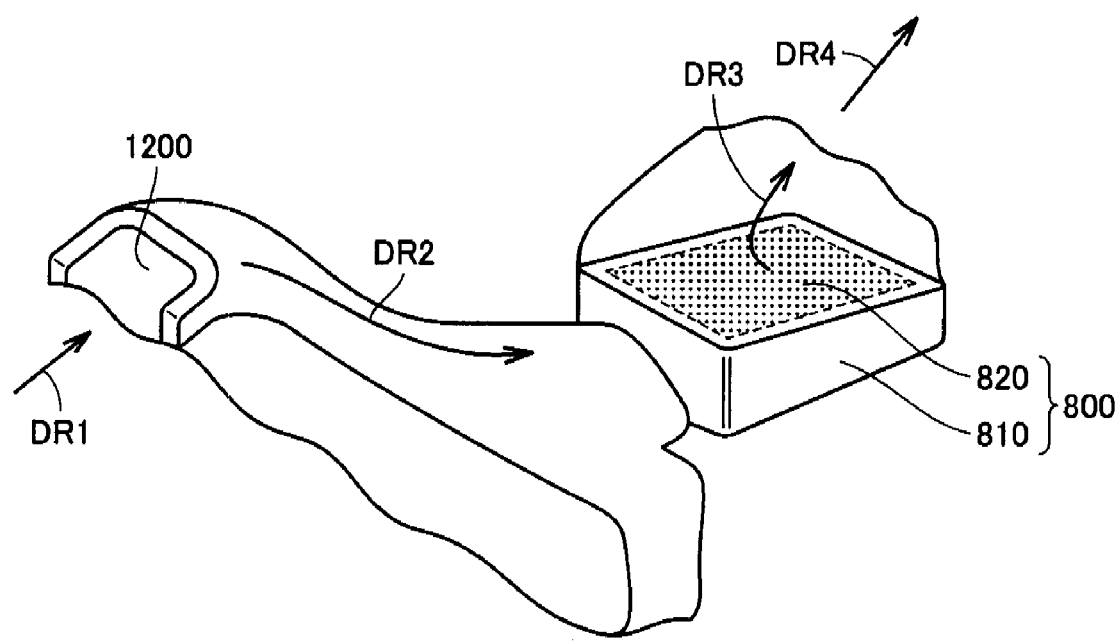
FIG. 6 illustrates a structure of an air cleaner.

FIG. 6 illustrates a structure of air cleaner 800. Referring to FIG. 6, air cleaner 800 includes an air cleaner case 810 and a filter 820. The air flown into air intake port 1200 in the arrow DR1 direction flows along the arrow DR2 direction, and led to the inside of air cleaner case 810. The air reaching air cleaner case 810 passes through filter 820. As a result, dust and the like in the air is removed. The air having passed through filter 820 flows in the arrow DR3, DR4 directions and lead to the air intake portion of engine 100.

In air cleaner 800 shown in FIG. 6, air cleaner case 810 is a component made of resin. Filter 820 stored in air cleaner case 810 is a fine filter paper containing fibers. Thus, air cleaner 800 is configured to include a resin-made portion (air cleaner case 810), and it is a "resin component" that deforms easier than PCU 700 when receiving a load such as collision load.

Summarizing the above, the electric equipment mounting structure according to the present embodiment includes: PCU 700 as "electric equipment" mounted inside engine room 2 (room for the internal combustion engine) as "a closed space" of hybrid vehicle 1; air cleaner 800 as "a resin component" mounted inside engine room 2 of hybrid vehicle 1 with a distance from PCU 700; and cables 900A, 900B, 900C as "lines" connected to the surface of PCU 700 facing air cleaner 800.

In the present embodiment, as above, the description has been provided about the case where: engine room 2 of hybrid vehicle 1 constitutes "a closed space of the vehicle"; PCU 700 including converter 710, inverter 720 and capacitors C1, C2 constitutes "electric equipment"; and air cleaner 800 provided in the air intake route of engine 100 constitutes "a resin component". Generally, the space inside the engine room of a vehicle is limited, and often lines are positioned between PCU 700 and other components. In contrast, by providing connection portions 901A, 901B, 901C being "line drawing portions" of PCU 700 at the portion facing air cleaner 800, cable 900 can be protected.

However, it is to be noted that the "vehicle", "closed space", "electric equipment" and "resin component" are not limited to "hybrid vehicle 1", "engine room 2", "PCU 700", and "air cleaner 800", respectively. For example, a unit other than PCU 700 that is of relatively high voltage (for example, about not less than 42V) and of which connection lines should desirably be protected may correspond to the "electric equipment". For example, as "electric equipment", equipment including at least one of a converter (for example, a DC-DC converter), an inverter and a capacitor or an actuator of high voltage can be used. Also, "a resin component" protecting cables 900 is not limited to air cleaner 800, and an arbitrary component including a resin portion capable of protecting cables 900 with a simple structure may be applicable. Furthermore, engine 100 being "an internal combustion engine" may be a gasoline engine or a diesel engine.

With the PCU mounting structure according to the present embodiment, when structures surrounding PCU 700 deforms or PCU 700 moves due to an external factor and whereby cables 900 are caught between PCU 700 and air cleaner 800, air cleaner 800 can deform to absorb the shock. Accordingly, without the necessity of providing a new member and while suppressing an increase in costs, cables 900A, 900B, 900C can be protected.

As to the foregoing description of the embodiment of the present invention, it should be understood that the embodiment disclosed herein is illustrative and non-restrictive in every respect. The scope of the present invention is defined by the terms of the claims, and is intended to include any changes within the scope and meaning equivalent to the terms of the claims.

INDUSTRIAL APPLICABILITY

The present invention is applicable to an electric equipment mounting structure, an electric vehicle and the like, for example.

The invention claimed is:

1. An electric equipment mounting structure, comprising:
   electric equipment including an inverter and mounted inside a closed space of a vehicle, said closed space being an engine room where an internal combustion engine is provided;
   a resin component mounted inside said closed space of the vehicle with a distance from said electric equipment; and
   a line connected to a surface, facing said resin component, of said electric equipment,
   wherein said resin component includes an air cleaner provided in an air intake route of said internal combustion engine.

2. The electric equipment mounting structure according to claim 1, wherein
   a plurality of said lines are connected to the surface, facing said resin component, of said electric equipment.

3. The electric equipment mounting structure according to claim 1, wherein
   said line is connected to a surface, positioned on a rear side of the vehicle, of said electric equipment.

4. The electric equipment mounting structure according to claim 1, wherein
   said electric equipment and said resin component are provided so as to align in a lateral direction.

5. The electric equipment mounting structure according to claim 1, further comprising
   an other line connected to a surface of said electric equipment, the surface being different from the surface facing said resin component, wherein
   said line is higher in voltage than said other line.

6. The electric equipment mounting structure according to claim 1, wherein
   said electric equipment is for a voltage not lower than 42V.

7. The electric equipment mounting structure according to claim 1, wherein
   lines for a voltage not lower than 42V connected to said electric equipment are all connected to the surface, facing said resin component, of said electric equipment.

8. The electric equipment mounting structure according to claim 1, wherein
   said air cleaner includes said case being a component made of resin and a filter stored in said case, and deforms easier than said electric equipment when receiving a load.

9. The electric equipment mounting structure according to claim 1, wherein
   said air cleaner is provided on a rear side of the vehicle relative to said electric equipment, and
   said line is connected to a side surface, positioned on the rear side of the vehicle, of said electric equipment.

10. The electric equipment mounting structure according to claim 1, further comprising
   a motor-generator driving the vehicle, wherein
   said electric equipment controls an operation of said motor-generator.

11. An electric vehicle comprising the electric equipment mounting structure according to claim 1.

* * * * *